United States Patent
Sireude

(10) Patent No.: US 10,711,934 B2
(45) Date of Patent: Jul. 14, 2020

(54) METHOD FOR MANUFACTURING A PIPE, PIPE AND CONNECTION FITTING ASSEMBLY

(71) Applicant: Stelia Aerospace, Rochefort (FR)

(72) Inventor: Damien Sireude, Nantes (FR)

(73) Assignee: STELIA AEROSPACE, Rochefort (FR)

( * ) Notice: Subject to any disclaimer, the term of this patent is extended or adjusted under 35 U.S.C. 154(b) by 535 days.

(21) Appl. No.: 15/377,739

(22) Filed: Dec. 13, 2016

(65) Prior Publication Data

US 2017/0191594 A1    Jul. 6, 2017

(30) Foreign Application Priority Data

Dec. 18, 2015  (FR) ..................... 15 62798

(51) Int. Cl.
*F16L 37/098* (2006.01)
*F16L 37/14* (2006.01)
*B21D 9/00* (2006.01)
*F16L 37/00* (2006.01)
(Continued)

(52) U.S. Cl.
CPC ............ *F16L 37/0985* (2013.01); *B21D 9/00* (2013.01); *F16L 37/008* (2013.01); *F16L 37/098* (2013.01); *F16L 37/144* (2013.01); *F16L 41/021* (2013.01); *F16L 47/02* (2013.01); *F16L 2201/10* (2013.01)

(58) Field of Classification Search
CPC ....... B21D 7/14; B21D 9/00; Y10T 29/49428; Y10T 29/49; Y10T 29/49826; F16L 37/0985; F16L 37/008; F16L 37/098; F16L 37/144; F16L 47/02; F16L 41/021; F16L 2201/10; F16L 37/09827

USPC ....... 29/428, 592, 890.14, DIG. 3; 72/31.04, 72/31.05, 269
See application file for complete search history.

(56) References Cited

U.S. PATENT DOCUMENTS 4,062,216 A * 12/1977 Hanamoto ............. B21D 7/025
                                                                      72/128
4,618,171 A * 10/1986 Fahl ........................ F16L 37/18
                                                                      285/312
(Continued)

FOREIGN PATENT DOCUMENTS

DE    102010010929    9/2011
EP      0319400       6/1989
(Continued)

OTHER PUBLICATIONS

Search Report from FR Intellectual Property Office on related FR application (FR1562798) dated Jul. 25, 2016.

*Primary Examiner* — Sarang Afzali
*Assistant Examiner* — Darrell C Ford
(74) *Attorney, Agent, or Firm* — Klein, O'Neill & Singh, LLP

(57) ABSTRACT

A method for manufacturing a pipe is described, wherein the method comprises a step of fastening a second mechanical quick connection member to a rectilinear hollow tubular body, a step of positioning the rectilinear hollow tubular body in a bending machine so that the angular coding mechanism of the second mechanical quick connection member is in a reference angular position with respect to said bending machine, and a step of bending the rectilinear hollow tubular body as a function of said angular reference position.

6 Claims, 4 Drawing Sheets

(51) Int. Cl.
*F16L 41/02* (2006.01)
*F16L 47/02* (2006.01)

(56) References Cited

U.S. PATENT DOCUMENTS

| | | | | |
|---|---|---|---|---|
| 5,142,895 | A * | 9/1992 | Schuchert | B21D 9/073 |
| | | | | 72/149 |
| 5,555,762 | A * | 9/1996 | Kawamura | B21D 9/15 |
| | | | | 72/369 |
| 5,669,258 | A * | 9/1997 | Luebke | B21D 7/063 |
| | | | | 33/377 |
| 5,950,486 | A * | 9/1999 | Owens | B21D 7/063 |
| | | | | 72/218 |
| 10,569,320 | B2 * | 2/2020 | Nobles | B21D 7/14 |
| 2005/0063125 | A1 | 3/2005 | Kato | |
| 2008/0087065 | A1 * | 4/2008 | Hainzinger | B21D 7/024 |
| | | | | 72/31.05 |
| 2008/0267698 | A1 * | 10/2008 | Rinkenberger | B21D 9/00 |
| | | | | 403/301 |
| 2009/0217732 | A1 * | 9/2009 | Chang | B21D 7/063 |
| | | | | 72/409.19 |
| 2017/0274437 | A1 * | 9/2017 | Klinger | B21D 7/063 |
| 2017/0299100 | A1 * | 10/2017 | Leffler | F16L 37/0985 |

FOREIGN PATENT DOCUMENTS

| | | |
|---|---|---|
| FR | 2622671 | 5/1989 |
| WO | WO 97/24545 | 7/1997 |

* cited by examiner

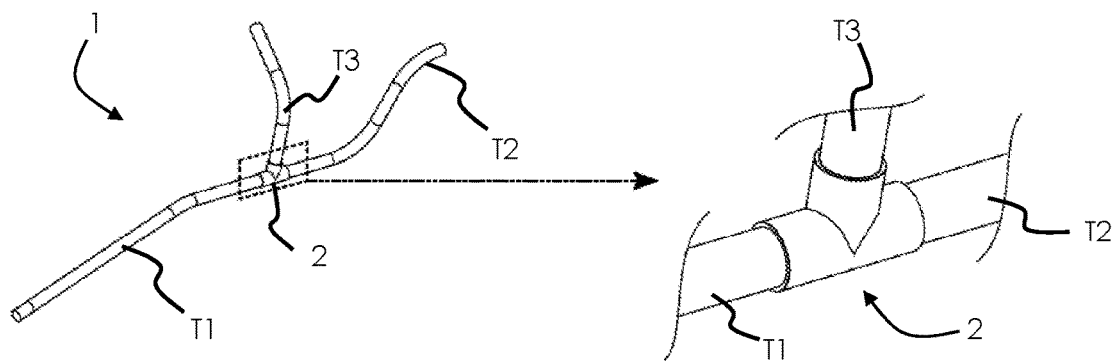
FIGURE 1
- PRIOR ART -
FIGURE 2
- PRIOR ART -
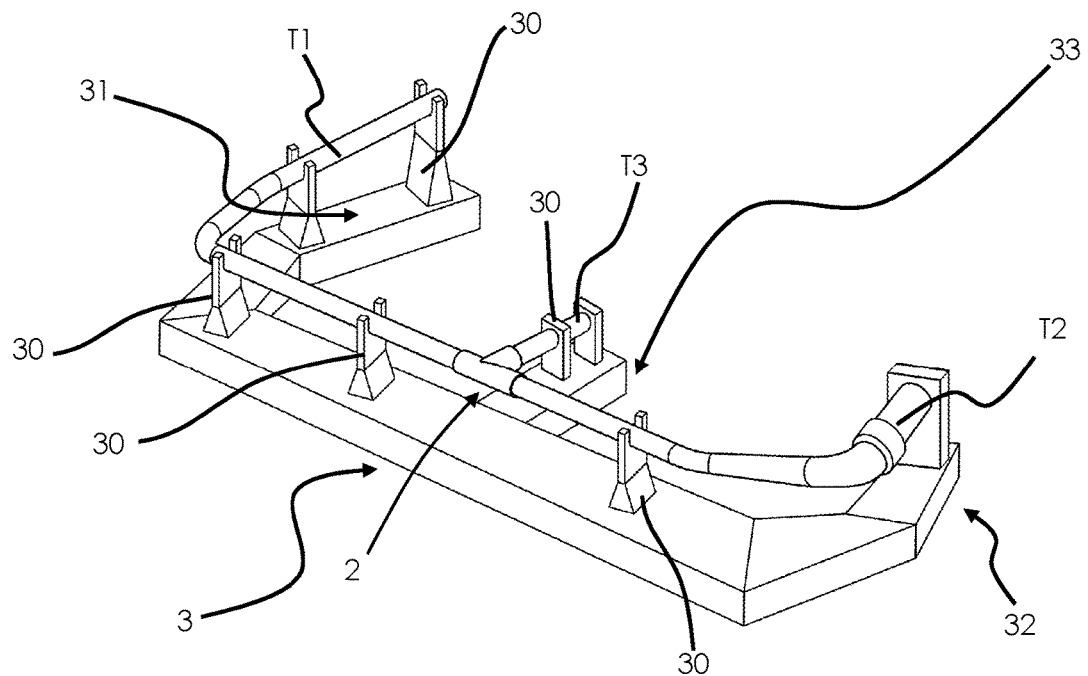
FIGURE 3
- PRIOR ART -

METHOD FOR MANUFACTURING A PIPE, PIPE AND CONNECTION FITTING ASSEMBLY

TECHNICAL FIELD

The present invention relates to the field of fluid circuits in an aircraft, for example, a circuit for drinking water, for wastewater, for drainage, etc.

In a known manner, a fluid circuit comprises a plurality of pipes mechanically and fluidly connected to each other. By way of example, with reference to FIGS. 1 and 2, there is shown a fluid circuit 1 comprising three pipes T1, T2, T3 connected to each other at a connection fitting 2. In an aircraft, the pipes T1, T2, T3 are generally bent by bending in order to adapt to the configuration of the aircraft in which they are to be mounted.

Connecting the bent pipes T1, T2, T3 is complex to implement because it requires crimping, welding or gluing the connection fitting 2 to said bent pipes T1, T2, T3 or direct welding of pipes T1, T2, T3 to each other. During the connection, it is necessary to orient and hold in place the bent pipes T1, T2, T3 and said connection fitting 2 fixedly by means of a wedging device, also called a "jig." As illustrated in FIG. 3, a wedging device 3 is made to measure and has a shape adapted to the bent pipes T1, T2, T3. In other words, for each type of fluid circuit and each form of pipes T1, T2, T3, it is necessary to provide a suitable wedging device 3, which requires a high investment and constraining management of the jigs. In addition, the connection requires numerous steps of manipulation, positioning, clamping and assembly which increase the duration of a connection and therefore its cost.

In this example, still with reference to FIG. 3, the wedging device 3 comprises three branches 31, 32, 33 for cooperating respectively with the pipes T1, T2, T3. In addition, each branch 31, 32, 33 comprises support member 30 with dimensions adapted to the bending of each pipe T1, T2, T3. Such a wedging device 3 also makes it possible to precisely define the angular orientation between the pipes T1, T2, T3 during the connection.

Such a connection method is expensive and complex to implement since it requires the manufacture of a wedging device for each type of connection.

Moreover, in case of failure, it is necessary to dispose of the T1-T3 pipes as well as the connection fitting 2, which represents a major drawback.

The object of the invention is therefore to eliminate at least some of these disadvantages by proposing a new type of connection fitting, a new type of pipe and a new connection method in order to produce a fluid circuit for aircraft in a quick and practical manner while limiting costs.

SUMMARY

The invention also relates to a method for manufacturing a pipe comprising a bent hollow tubular body comprising two fluidly connected end openings and at least one second mechanical quick connection member at an end opening, adapted for cooperating with a first mechanical quick connection member of a connection fitting comprising an angular coded mechanism, said second mechanical quick connection member comprising an angular coded mechanism adapted to cooperate with the angular coded mechanism of the first mechanical quick connection member of the fitting according to a predetermined angular position, the method comprising:

- a step of fastening a second mechanical quick connection member to a rectilinear hollow tubular body,
- a step of positioning the rectilinear hollow tubular body in a bending machine so that the angular coding mechanism of the second mechanical quick connection member is in a reference angular position with respect to said bending machine and
- a step of bending the rectilinear hollow tubular body according to said reference angular position.

Thanks to this method, the bending is carried out with respect to the second connection member, that is to say, with respect to its orientation of assembly with the connection fitting. Such a method offers great flexibility for the manufacture of pipes while improving the assembly without the use of a wedging jig. Advantageously, such flexibility in the manufacture of the pipes allows using low-cost standardized form connection fittings.

Preferably, the bending machine comprises a coding mechanism adapted to cooperate with the angular coding mechanism of the second mechanical quick connection member in the reference angular position. Thus, the second mechanical quick connection member is positioned precisely and rigorously in the bending machine. The pipe can be bent by taking into account its future connection.

According to another embodiment, the second connection member is mounted after bending.

Preferably, the positioning step of the rectilinear hollow tubular body in the bending machine is performed manually. Thus, an operator precisely places the pipe according to the desired orientation, in particular, by member of a jig.

Preferably, the bending step is performed according to the inclination of the bending angle with respect to the determined reference angular position. In other words, the bent portion closest to the second mechanical quick connection member is determined according to the orientation of said second mechanical quick connection member. Thus, when several pipes are assembled together by member of a fitting, these are perfectly positioned with respect to one another. The machine advantageously takes into account the orientation of the pipe when the bending is carried out so that the pipe can connect only in a predetermined orientation.

The invention also relates to an assembly of a pipe obtained by the method according to the invention and a connection fitting for an aircraft fluid circuit pipe, the fitting comprising a hollow body having at least two fluidly connected openings. The fitting comprises, at at least one opening, a first mechanical quick connection member, which comprises an angular coding mechanism, adapted to cooperate in a sealed manner with a second mechanical quick connection member of an aircraft fluid circuit pipe in a predetermined angular position.

Advantageously, thanks to the invention, forming a fluid circuit comprising several pipes connected together is simple and quick. Advantageously, the connection is made without tools, by hand. Moreover, the relative angular position between the fitting and the pipe to be connected is defined precisely by virtue of the angular coding mechanism, which advantageously allows to no longer resort to a wedging device according to the prior art. The relative angular position is advantageously defined during the manufacture of the fluid circuit pipe. The connection fitting advantageously fulfills a double function and makes it possible, on the one hand, to fluidly connect several pipes and, on the other hand, to ensure precise relative angular positioning.

Preferably, the first mechanical quick connection member is configured to cooperate with the second mechanical quick connection member by interlocking, in particular, along the axis of the opening that is to be connected. Such a connection is simple to implement and requires little manipulation of the fitting or the pipe. The risk of damage during connection is limited.

Preferably, the first mechanical quick connection member is configured to automatically lock with the second mechanical quick connection member during the cooperation.

According to one aspect, the first mechanical quick connection member is adapted to cooperate definitively with the second mechanical quick connection member so as to form a robust and long-term connection.

According to another aspect, the first mechanical quick connection member is adapted to cooperate in a removable manner with the second mechanical quick connection member. Thus, a pipe comprising a defect can advantageously be disassembled, for example for a maintenance operation, and replaced if necessary by a new pipe.

Preferably, the fitting comprises at least three openings.

Preferably, all the openings comprise a first mechanical quick connection member. Thus, the fluid circuit is formed quickly by simple assembly of the pipes on the connection fitting.

According to one aspect, all the first mechanical quick connection members are identical, which facilitates industrialization. According to another aspect, the mechanical quick connection members are different. Thus, each pipe can cooperate only with a single pipe, which avoids any incorrect assembly.

The invention also relates to a pipe comprising a bent hollow tubular body comprising two fluidly connected end openings and at least one second mechanical quick connection member at an end opening adapted to cooperate with the first mechanical quick connection member of a fitting such as previously described, said second mechanical quick connection member comprising an angular coding mechanism configured to cooperate with the angular coding mechanism of the first mechanical quick connection member of the fitting in a predetermined angular position.

Thus, the second mechanical quick connection member allows defining the angular orientation with the connection fitting. Thus, the relative angular orientation of the second connection member with respect to the tubular body of the pipe defines a relative angular orientation with respect to the connection fitting. In other words, the relative angular orientation of the second mechanical quick connection member allows determining the shape of the fluid circuit during assembly, which is advantageous.

Preferably, the pipe comprises a second quick connection member at each opening.

Preferably, each second mechanical quick connection member of the pipe comprises an angular coding mechanism. Thus, the assembly of a complex fluid circuit is simple to implement.

The invention also relates to an assembly of a connection fitting as described above and at least one pipe as previously described, the angular coding mechanism of the first mechanical quick connection member of said fitting cooperating with the angular coding mechanism of the second mechanical quick connection member of the pipe according to a predetermined angular position.

The invention also relates to a method for connecting two pipes as previously described by means of a connection fitting as described above in order to form an aircraft fluid circuit, the connection fitting comprising at least two openings each comprising a first mechanical quick connection member, each pipe comprising, at at least one end, a second mechanical quick connection member, the method comprising:

a step of cooperation of the first mechanical quick connection member of a first opening of the connection fitting with the second quick connection member of a pipe according to a first determined angular position, and a step of cooperation of the first mechanical quick connection member of a second opening of the connection fitting with the second quick connection member of the other pipe according to a second determined angular position.

Such a connection method is quick and precise, no wedging device being necessary. The logistics are thus improved.

BRIEF PRESENTATION OF THE DRAWINGS

The invention will be better understood on reading the description which follows, given solely by way of example, and with reference to the accompanying drawings, in which:

FIG. 1 is a schematic representation of a fluid circuit comprising three pipes connected according to the prior art;

FIG. 2 is a close-up view of the fitting of FIG. 1;

FIG. 3 is a schematic representation of pipes mounted in a wedging device during a connection method according to the prior art;

It should be noted that the figures show the invention in detail in order to implement the invention, said figures naturally serving to better define the invention as the case may be.

DETAILED DESCRIPTION

Figure 4:
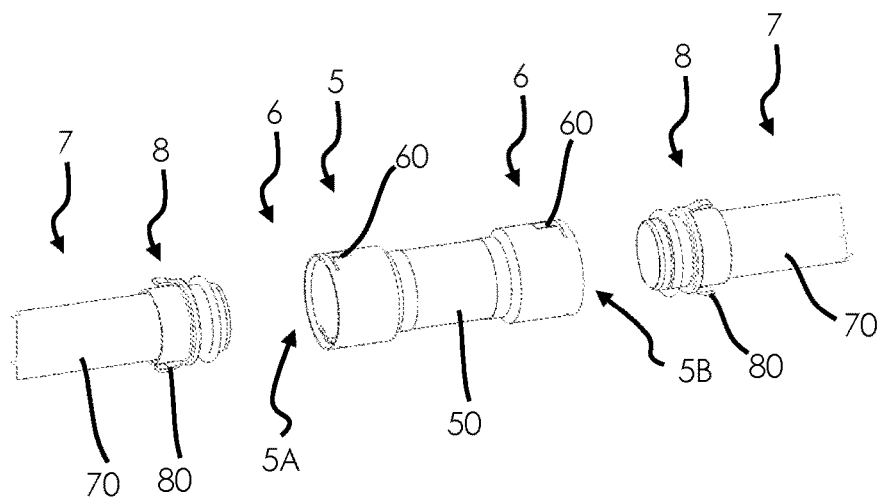
FIG. 4 is a schematic representation of a connection fitting and two pipes according to an embodiment of the invention.

With reference to FIG. 4, there is shown a connection fitting 5 according to the invention for connecting two pipes 7 according to the invention and thus forming a fluid circuit.

Figure 5:
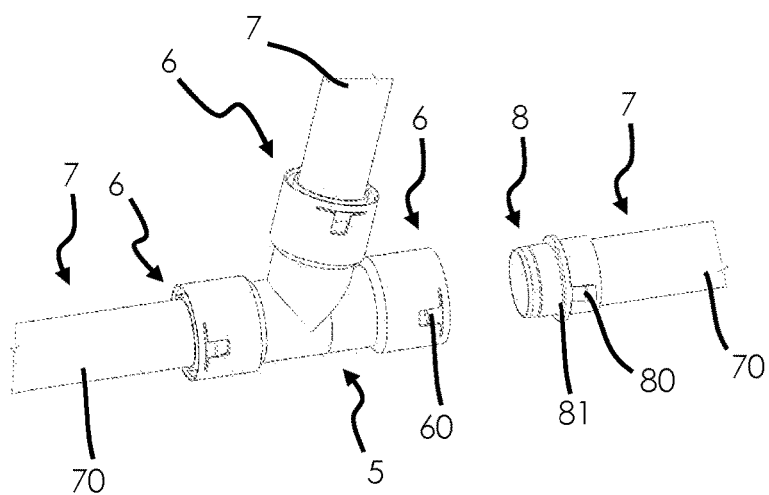
FIG. 5 is a schematic representation of a connection fitting and three pipes according to another embodiment of the invention.
Figure 6:
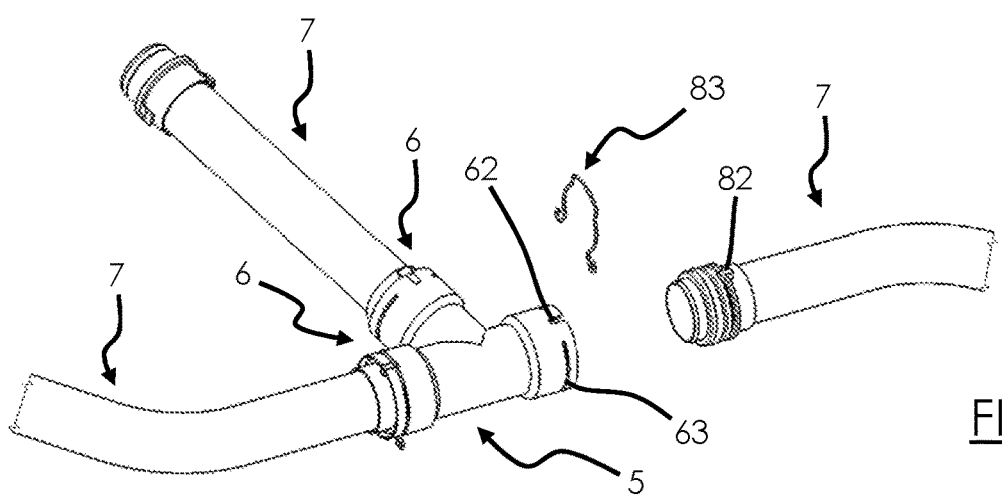
FIG. 6 is another schematic representation of a connection fitting and three pipes according to another embodiment of the invention.

In this example, the connection fitting 5 comprises a hollow body 50 comprising two openings 5A-5B fluidly connected to one another. The fitting 5 has a straight body 50 for interconnecting the two pipes 7, the openings 5A-5B being formed at the ends of the body 50. Preferably, each opening 5A-5B has an annular section. It goes without saying that the invention also applies to a connection fitting 5 capable of connecting more than two pipes 7, in particular 3, as illustrated in FIGS. 5 and 6.

The connection fitting 5 comprises, at each opening 5A-5B, a first mechanical quick connection member 6 adapted to cooperate in a sealed manner with a second mechanical quick connection member 8 of an aircraft fluid circuit pipe 7, as shown in FIG. 4. Pipe 7 will be presented below.

The cooperation of said mechanical quick connection members 6, 8 allows forming a quick fitting, preferably by mechanical interlocking. Preferably, the seal is guaranteed for an internal pressure range between −980 mbar (−98 kPa) and 30 bar (3000 kPa). The mechanical quick connection members 6, 8 are preferably of the male/female type.

Preferably, the first mechanical quick connection members 6 of the connection fitting 5 are of the "female" type, while the second mechanical quick connection members 8 of the pipes 7 are of the "male" type. Nevertheless, it goes without saying that the opposite could also be possible. Similarly, a connection fitting 5 may also comprise, at one opening, a first mechanical quick connection member 6 of the "male" type and, at another opening, a first mechanical quick connection member 6 of the "female" type.

In this example, each first mechanical quick connection member 6 is adapted to cooperate in a removable manner with a second mechanical quick connection member 8. Thus, a pipe 7, damaged or defective, can be quickly replaced. It goes without saying that such a removable connection is optional. In particular, the connection members 6, 8 can cooperate permanently in order to prevent any disassembly.

According to a preferred aspect, the first mechanical quick connection members 6 and the second mechanical quick connection members 8 are locked by clicking, snapping or screwing.

With reference to FIGS. 4 and 5, the second mechanical quick connection member 8 of the pipe 7 comprises two diametrically opposite lugs 80, and the first mechanical quick connection member 6 of the fitting 5 has two diametrically opposite orifices 60 for cooperating with said lugs 80 and thus simultaneously enabling a tight interlocking and fastening. If necessary, with reference to FIG. 5, the second mechanical quick connection member 8 may also include a gasket 81.

According to another embodiment, with reference to FIG. 6, the second mechanical quick connection member 8 of the pipe 7 comprises two insertion fingers 82 and the first mechanical quick connection member 6 of the fitting 5 has two notches 62 for cooperating with said insertion fingers 82 and thus enabling a tight interlocking and preventing any rotation between said connecting members 6, 8. With reference to FIG. 6, a locking member 83 is mounted on said members 6, 8 to prevent any disassembly. In this example, the locking member 83 is a U-shaped metal element and the first mechanical quick connection member 6 of the fitting 5 comprises a slot 63 adapted to receive the said metal element 83 and to lock together the connection members 6, 8.

The connection fitting 5 is preferably one-piece. It is preferably made of metal or plastic. Advantageously, a range is defined which comprises a limited number of connection fitting types in order to be able to connect together a different number of pipes along several different orientations. Advantageously, the connection fittings 5 can be standardized, which reduces the cost thereof.

With reference to FIG. 4, the pipe 7 comprises, for its part, a bent hollow tubular body 70 having two fluidly connected end openings and at least one second quick connection member 8, fixed at an end opening, adapted to cooperate with the first quick connection member 6 of the connection fitting 5. The pipe 7 may be made of metal or plastic.

Thus, without a tool, an operator can assemble multiple pipes 7 using a connection fitting 5 and thus form a fluid circuit.

Advantageously, the first mechanical quick connection member 6 comprises an angular coding mechanism (such as orifice 60 and lug 80) configured to allow cooperation with the second mechanical quick connection member 8 in a predetermined angular position. The coding mechanism thus makes it possible to prohibit any relative rotation between the quick connection members 6, 8 and, more generally, between a pipe 7 and its connection fitting 5.

The connection of a pipe 7 and a connection fitting 5 is thus made possible only by interlocking the pipe 7 with the connection fitting 5 for a predetermined angular position.

Figure 7:
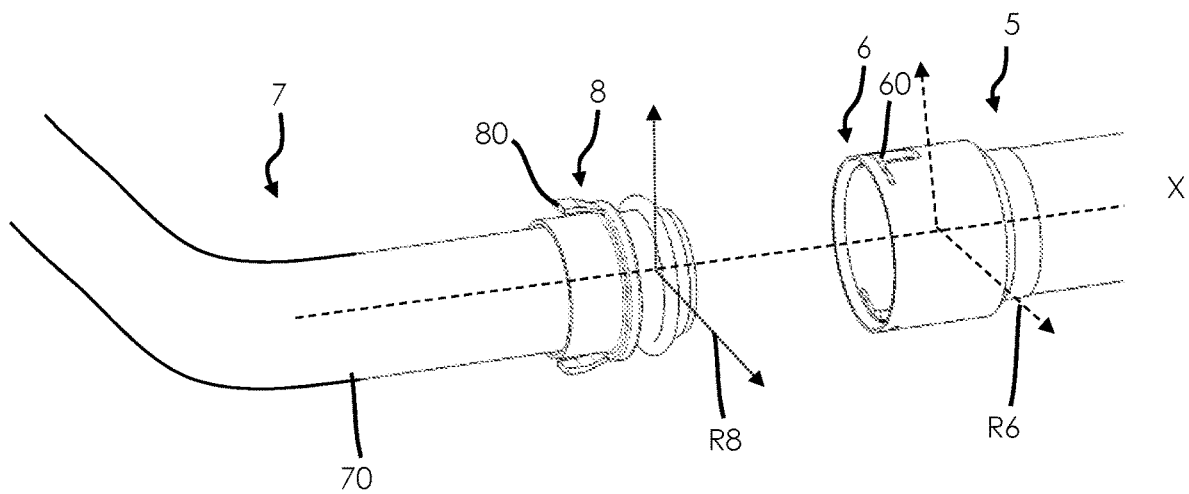
FIG. 7 is a schematic representation of the connection of a pipe to a fitting according to a determined angular position.

With reference to FIG. 7, the opening of a bent pipe 7 is aligned with the opening 5A of the connection fitting 5 along an axis X. The first connection member 6 comprises a coding mechanism defining a first reference frame R6 while the second connection member 8 comprises a coding mechanism defining a second reference frame R8. In order to allow interlocking, the first reference frame R6 must be aligned with the second reference frame R8. In other words, during assembly, the angular position of the pipe 7 is perfectly defined with respect to that of the connection fitting 5. If one of the reference frames R6, R8 is offset angularly, no interlocking is possible.

Preferably, all the connection members 6, 8 are equipped with a coding mechanism. Thus, the fluid circuit, obtained by connecting several pipes 7, has a precisely determined shape. The connection fitting 5 thus has a dual function by allowing, on the one hand, ensuring a sealed mechanical connection and, on the other hand, ensuring precise angular positioning of the pipes. Thus, it is not necessary to use a wedging device, as described previously with reference to FIG. 3.

Figure 9:
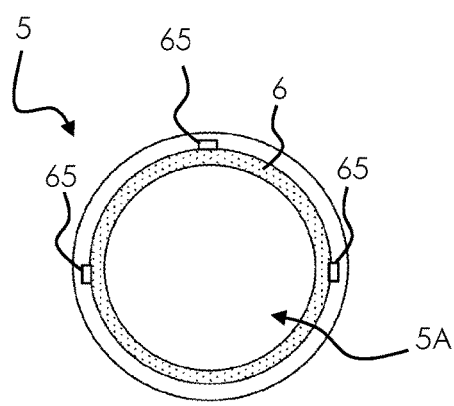
FIG. 9 is a schematic example of a coding mechanism.
Figure 10:
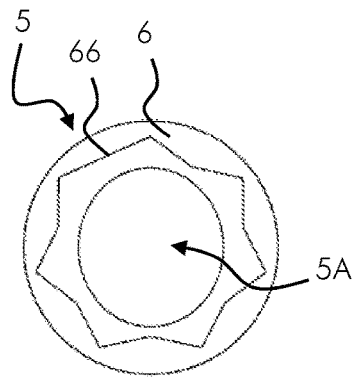
FIG. 10 is another schematic example of another coding mechanism.
Figure 11:
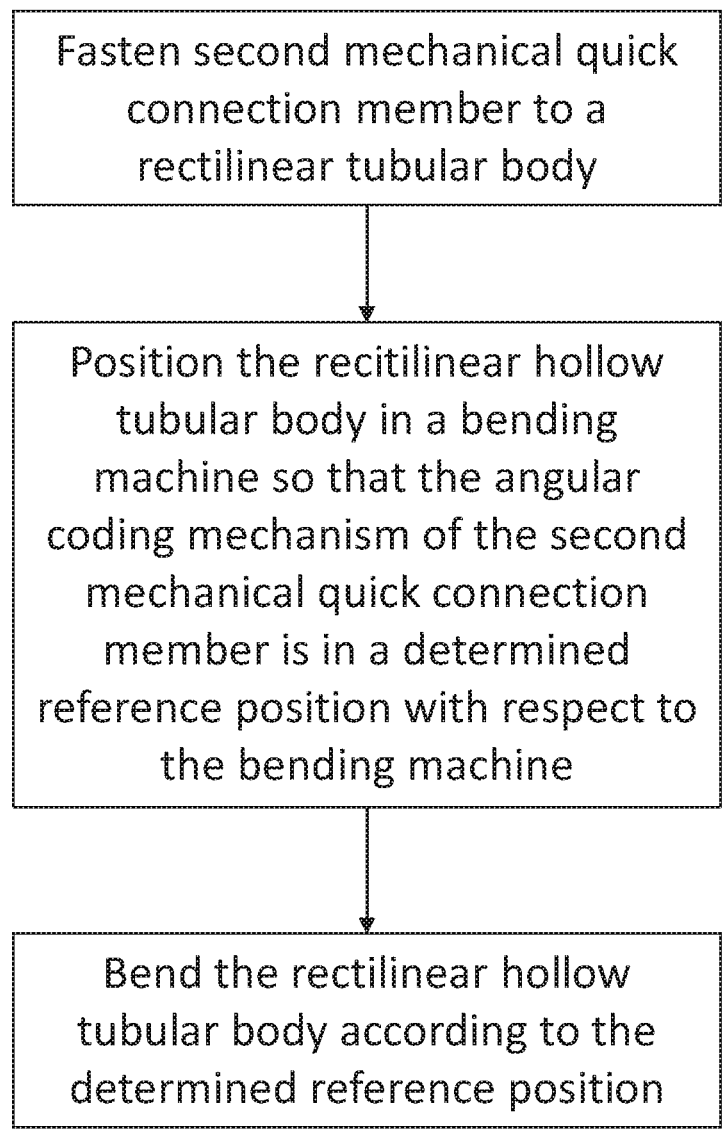
FIG. 11 shows a representation of a bending machine and angular coding mechanism.

By way of example, with reference to FIGS. 9 and 10, several forms of coding mechanisms will be represented. With reference to FIG. 9, the coding mechanism comprises three orientation elements 65 spaced 90° apart at the periphery of an opening 5A of the connection fitting 5. In this case, the second quick connection member 8 comprises three complementary orientation elements (not shown) spaced 90° apart at the periphery of an opening of the pipe 7. The orientation elements 65 may be in the form of lugs, insertion fingers, notches, orifices, etc. It goes without saying that the number of orientation elements 65 could be different as well as their position, their geometry and their location on the first or second quick connection member 6, 8.

With reference to FIG. 10, the coding mechanism comprises an imprint 66 formed at the periphery of an opening 5A of the connection fitting 5. In this case, the second quick connection member 8 comprises a complementarily shaped imprint (not shown) at the periphery of an opening of the pipe 7. The imprint 66 comprises a flat part so as to allow fitting with the imprint of complementary shape only for a single predetermined angular position. It goes without saying that the angular coding mechanism could take various forms, as is shown in FIGS. 9 and 10.

By means of the coding mechanisms, a first connection member 6 of the connection fitting 5 can only connect to a second connection member 8 of a pipe 7 if the second connection member 8 is in the angular orientation defined by the first connection member 6.

In order to obtain a fluid circuit of a desired shape, it is important to define the angular orientation of the bent hollow tubular body 70 of the pipe 7 with respect to the angular orientation of its second connection member 8. For this purpose, a method for manufacturing a pipe 7 will now be presented.

By way of example, the method for manufacturing a pipe 7 comprises:
- a step of fastening a second mechanical quick connection member 8 to a rectilinear hollow tubular body,
- a step of positioning the rectilinear hollow tubular body in a bending machine 100 so that the angular coding mechanism 101 of the second mechanical quick connection member 8 is in a determined reference position with respect to said bending machine 100, and
- a step of bending the rectilinear hollow tubular body according to said determined reference position.

By means of the manufacturing method, the angular position of the second mechanical quick connection member 8 is perfectly defined with respect to the bent hollow tubular body 70 since the bending is carried out with respect to the angular position of the second mechanical quick connection member 8. In other words, the manufacture of the pipe 7 is carried out taking into account its future connection.

The step of fastening the second connection member 8 to a rectilinear hollow tubular body is quick and simple to implement, for example by crimping, gluing or welding. Such fastening can be achieved in a simplified manner since it is carried out on rectilinear tubular bodies.

Such a manufacturing method is particularly advantageous for manufacturing a fluid circuit of complex shape since it allows forming pipes whose bending is controlled and whose angular position of assembly with the connection fitting 5 is determined with precision. Thanks to the flexibility achieved for the manufacture of the pipes 7, low-cost standardized form connection fittings can be advantageously used.

The step of assembling the pipes 7 with the connection fittings 5 is very simple to achieve by an operator, which limits the risk of damage.

The positioning step of the rectilinear hollow tubular body in the bending machine 100 is preferably carried out manually. To this end, the bending machine 100 comprises a coding mechanism adapted to cooperate with the angular coding mechanism 101 of the second mechanical quick connection member 8 in the determined reference position. In particular, the bending machine 100 comprises a jig for receiving the second mechanical quick connection member 8 in the determined reference angular position. Nevertheless, it goes without saying that the bending machine 100 could also automatically detect the reference angular position of the second mechanical quick connection member 8, for example, by means of an image processing module.

The bending step is carried out as a function of the reference position determined from parameters (bending angle, bending radius, inclination of the bending angle with respect to the determined reference position, length of advance of the tubular body, etc.). By way of example, during the bending step, a rotation of the hollow tubular body about its axis can be carried out in order to obtain the inclination of the bending angle defined for the determined bending operation.

According to another embodiment, the second connection member 8 is mounted after bending the rectilinear hollow tubular body.

Figure 8:
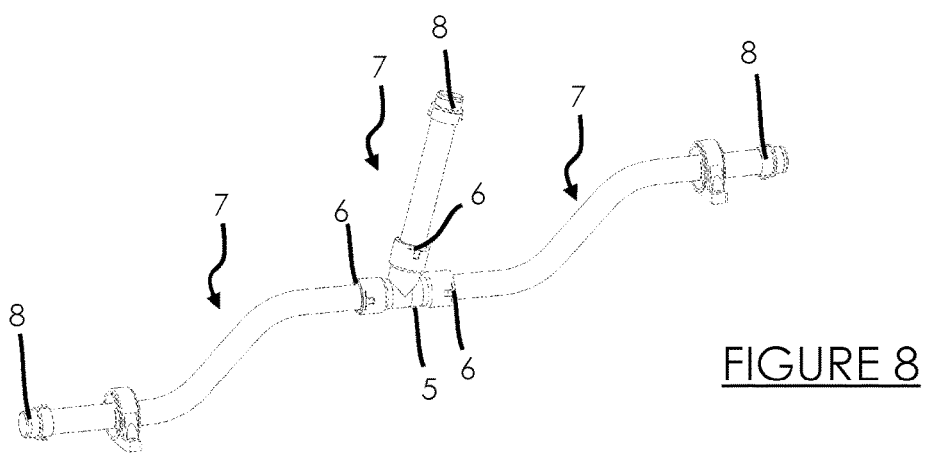
FIG. 8 is a schematic representation of a fluid circuit comprising three pipes connected according to the invention.

In order to form a fluid circuit, it suffices to cause the second mechanical quick connection member 8 to cooperate with the first mechanical quick connection member 6 in order to connect in a sealed, quick and precise manner a pipe 7 to the connection fitting 5, as illustrated in FIG. 8.

Advantageously, the assembly is carried out manually, without tools. Logistics are also greatly facilitated since it is not necessary to have a large stock of voluminous wedging devices. Thanks to the invention, the construction of a fluid circuit is facilitated and the assembly time is reduced. During the tests, the assembly time was reduced by approximately 80%.

The invention also relates to an assembly of at least one pipe and a connection fitting, the connection fitting comprising a hollow body having at least two fluidly connected openings, a first mechanical quick connection member mounted at an opening, the pipe comprising a bent hollow tubular body having two fluidly connected end openings and at least one second quick connection member, at an opening, adapted to sealingly engage the first mechanical quick connection member of the connection fitting. In other words, the invention also applies to a quick mechanical connection without an angular coding mechanism.

The invention claimed is:

1. A method for manufacturing a pipe comprising:
   providing a second mechanical quick connection member;
   wherein the second mechanical quick connection member has a second angular coding mechanism defining a second reference frame having an X-Y-Z axis;
   wherein the second angular coding mechanism and the first angular coding mechanism cooperated to prohibit relative rotation along the X-axes of both the first reference frame and the second reference frame when the first mechanical quick connection member interlocks with the second mechanical quick connection member at a first predetermined reference angular position;
   providing a bending machine comprising a third coding mechanism defining a third reference frame having an X-Y-Z axis, the third coding mechanism being adapted to cooperate with the second angular coding mechanism of the second mechanical quick connection member at a second predetermined reference angular position to prohibit relative rotation along the X-axes of both the third reference frame and the second reference frame;
   fastening the second mechanical quick connection member to an end opening of a rectilinear hollow tubular body comprising two fluidly connected end openings;
   positioning the rectilinear hollow tubular body in said bending machine so that the second angular coding mechanism cooperates with the third coding mechanism to prevent relative rotation along the X-axes of both the second reference frame of said rectilinear hollow tubular body and the third reference frame of said bending machine; and
   bending the rectilinear hollow tubular body as a function of said angular reference position.

2. The manufacturing method according to claim 1, wherein the step of positioning the rectilinear hollow tubular body in the bending machine is carried out manually.

3. The manufacturing method according to claim 1, wherein the step of bending is performed as a function of an inclination of a bending angle with respect to the angular reference position.

4. The manufacturing method according to claim 1;
   wherein the first angular coding mechanism comprises a pair of notches; and
   wherein the second angular coding mechanism comprises a pair of insertion fingers configured to interlock with the pair of notches to prevent rotation of the second mechanical quick connection member about the X-axes of both the first reference frame and the second reference frame.

5. The manufacturing method according to claim 1;
wherein the angular coding mechanical of the first mechanical quick connection member comprises a first set of orientation elements spaced apart at a periphery of the first mechanical quick connection member;
wherein the angular coding mechanism of the second mechanical quick connection member comprises a second set of orientation elements spaced apart at a periphery of the second mechanical quick connection member; and
wherein the second set of orientation elements are complimentary to the first set of orientation elements and are configured to interlock with the first set of orientation elements to prevent rotation of the second mechanical quick connection member about the X-axes of both the first reference frame and the reference frame.

6. The manufacturing method of claim 1, further comprising:
mounting the second mechanical quick connection member to a third mechanical quick connection member,
wherein the third mechanical quick connection member comprises a third angular coding mechanism having an X-Y-Z axis; and
wherein the second angular coding mechanism and the third angular coding mechanism cooperated to prohibit relative rotation along the X-axes of both the second reference frame and the third reference frame when the second mechanical quick connection member interlocks with the third mechanical quick connection member during mounting.

* * * * *